(12) United States Patent
Vinci et al.

(10) Patent No.: US 10,961,415 B2
(45) Date of Patent: Mar. 30, 2021

(54) METHOD OF MAKING LAMINATES HAVING REDUCED OXYGEN PERMEABILITY

(71) Applicants: Dow Global Technologies LLC, Midland, MI (US); Rohm and Haas Company, Philadelphia, PA (US)

(72) Inventors: Daniele Vinci, Lucerne (CH); Mai Chen, Chicago, IL (US); Thomas Udhayasingh, Huenenburg (CH); Thorsten Schmidt, Richterswil (CH)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 0 days.

(21) Appl. No.: 15/029,391

(22) PCT Filed: Oct. 8, 2014

(86) PCT No.: PCT/US2014/059626
§ 371 (c)(1),
(2) Date: Apr. 14, 2016

(87) PCT Pub. No.: WO2015/057444
PCT Pub. Date: Apr. 23, 2015

(65) Prior Publication Data
US 2016/0230046 A1    Aug. 11, 2016

Related U.S. Application Data

(60) Provisional application No. 61/891,182, filed on Oct. 15, 2013.

(51) Int. Cl.
| | |
|---|---|
| *C09J 5/06* | (2006.01) |
| *C08G 18/66* | (2006.01) |
| *C08G 18/10* | (2006.01) |
| *C08G 18/36* | (2006.01) |
| *C08G 18/42* | (2006.01) |
| *B32B 27/08* | (2006.01) |
| *B32B 27/10* | (2006.01) |
| *B32B 27/32* | (2006.01) |
| *B32B 27/36* | (2006.01) |
| *B32B 27/40* | (2006.01) |
| *B32B 29/00* | (2006.01) |
| *B32B 37/12* | (2006.01) |
| *C09J 175/06* | (2006.01) |

(52) U.S. Cl.
CPC ............... *C09J 5/06* (2013.01); *B32B 27/08* (2013.01); *B32B 27/10* (2013.01); *B32B 27/32* (2013.01); *B32B 27/36* (2013.01); *B32B 27/40* (2013.01); *B32B 29/00* (2013.01); *B32B 37/12* (2013.01); *C08G 18/10* (2013.01); *C08G 18/36* (2013.01); *C08G 18/42* (2013.01); *C08G 18/6662* (2013.01); *C09J 175/06* (2013.01); *B32B 2250/03* (2013.01); *B32B 2305/72* (2013.01); *B32B 2307/724* (2013.01)

(58) Field of Classification Search
CPC .......................................................... C09J 5/06
See application file for complete search history.

(56) References Cited

U.S. PATENT DOCUMENTS

| | | | | |
|---|---|---|---|---|
| 2003/0066600 | A1* | 4/2003 | Kauffman | B32B 7/12 156/274.4 |
| 2004/0259968 | A1* | 12/2004 | Krebs | C09J 175/04 521/170 |
| 2006/0105188 | A1* | 5/2006 | Simons | B32B 27/32 428/483 |
| 2008/0261048 | A1* | 10/2008 | Chen | C09J 175/06 428/413 |
| 2013/0018152 | A1* | 1/2013 | Brinkman | C08G 18/12 525/123 |
| 2016/0208146 | A1* | 7/2016 | Arai | C08G 18/8074 |
| 2016/0215184 | A1* | 7/2016 | Umino | B32B 27/36 |

FOREIGN PATENT DOCUMENTS

| | | | |
|---|---|---|---|
| EP | 0849343 A1 | 6/1998 | |
| EP | 0906944 A2 * | 4/1999 | ......... C08G 18/4238 |
| EP | 0906944 A2 | 4/1999 | |
| EP | 0952919 A1 | 11/1999 | |
| EP | 1081170 A2 | 3/2001 | |
| EP | 1217052 A2 | 6/2002 | |
| EP | 2316642 A1 | 5/2011 | |

OTHER PUBLICATIONS

Polyakova, A.; Stepanov, E. V.; Sekelik, D.; Schiraldi, D. A.; Hiltner, A; Baer, E.; Journal of Polymer Science: Part B: Polymer Physics, vol. 39, 1911-1919 (2001).
Hedenqvist, D. H.; Gedde, U. W. Prog Polym Sci 1996, 21, 299.
PCT/US2014/059626, International Search Report dated Apr. 23, 2015.
PCT/US2014/059626, International Preliminary Report on Patentability dated Feb. 12, 2016.
PCT/US2014/059626, Written Opinion of the International Searching Authority dated Apr. 23, 2015.
PCT/US2014/059626, Reply to Written Opinion of the International Searching Authority dated Aug. 14, 2015.

* cited by examiner

*Primary Examiner* — Daniel H Lee

(57) ABSTRACT

Laminates of polymeric films and solvent-based polyurethane adhesive formulations for preparing them are provided. The adhesive formulations include a hydroxyl-terminated polyester that forms crystalline polyester domains after reaction with an appropriate polyisocyanate, but prior to completion of cure. The result is an adhesive layer that substantially enhances the oxygen barrier properties of the adhesive and, therefore, of the laminate as a whole, while offering desirable convenience of application even at relatively low temperatures. The laminates may also exhibit desirable retention of barrier properties following flex-cracking.

9 Claims, No Drawings

METHOD OF MAKING LAMINATES HAVING REDUCED OXYGEN PERMEABILITY

CROSS-REFERENCE TO A RELATED APPLICATION

This application claims the benefit of U.S. Provisional Patent Application Ser. No. 61/891,182, filed Oct. 15, 2013, which is incorporated herein by reference in its entirety.

The invention relates to laminating adhesive formulations and laminates prepared therewith. More particularly, it relates to polymeric film laminates that exhibit enhanced barrier properties with respect to oxygen.

Polymeric materials, particularly polymeric films, are widely used for packaging purposes, finding extensive application in the food and drug industries. In these and other uses, exposure of the packaged product to oxygen and/or other gases may be highly undesirable, where such exposure results in degradation of the product over time. Unfortunately, many polymeric films are inherently relatively permeable to oxygen. One approach to enhancing oxygen barrier properties that has been investigated has been to use multiple layers of such polymeric materials, with the layers bonded together with an adhesive to form laminates.

A number of laminating adhesives are known in the art. Such adhesives are frequently characterized as being either solvent-based or solventless. In some cases solvent-based adhesives are water-borne. For example, polyvinylidine chloride (PVDC) formulations are typically water-based. Unfortunately, in some of these formulations either the solvent itself or the adhesive remaining after solvent removal may represent a workplace and/or environmental danger. Furthermore, solvent removal represents additional energy expenditure.

Another formulation that may be useful for barrier applications is ethylene vinyl alcohol (EVOH), which can be applied either as a water-borne formulation or, alternatively, coextruded with a polymeric film. Each route has an advantage and a disadvantage. Water-borne formulations are useful to adhere polymeric films having low melt temperatures, because EVOH has a high melt temperature (greater than 150° C.), which will melt or deform many polymeric films. However, then energy must be expended to remove the water. In contrast, coextrusion may be useful where the laminate will be exposed to high humidity, since such conditions tend to increase the oxygen transmission rate of EVOH dramatically. However, the coextrusion route results in a relatively complex structure.

A solventless formulation is represented by U.S. Pat. No. 6,589,384 B2 to Chen, et al. This patent discloses a solventless laminating polyurethane adhesive having barrier properties. The adhesive is based on a linear aliphatic, preferably C3-C6 diol that has been reacted with a linear carboxylic acid. The resultant adhesive forms a crystalline adhesive layer that then cures to impart certain improved barrier properties.

It will be seen, then, that there remains a need in the art for new and efficient, convenient adhesives providing polymeric film laminates with desirable levels of oxygen barrier capability which are desirably relatively inexpensive and which preferably do not represent workplace and/or environmental challenges.

Accordingly, and in one aspect, the invention provides a method of making a laminate, comprising (a) preparing an adhesive mixture by (i) providing a single species of polyisocyanate (A) as an A-component; (ii) also providing a hydroxyl-terminated polyester (B), formed from a single species of a linear aliphatic diol having terminal hydroxyl groups and from 2 to 10 carbon atoms, and a single species of a linear dicarboxylic acid, the polyester having a number average molecular weight from 300 to 5000 and a melting point of 80° C. or below, the hydroxyl-terminated polyester (B) being incorporated as substantially miscible solids in a carrier solvent in an amount of at least 20 percent by weight, based on the weight of (A) and the carrier solvent, to form a B-component; (b) either (i) mixing the A-component and the B-component at an NCO/OH ratio from 1 to 2 to form an adhesive mixture (I), or (ii) reacting all or a portion of the A-component and a portion of the B-component at an NCO/OH ratio of from 2 to 8 to form a prepolymer (C) and then mixing the remaining portion of the B-component and any remaining portion of the A-component with the prepolymer (C) to form an adhesive mixture (II) having an NCO/OH ratio from 1 to 2; (c) applying a layer of at least one of the adhesive mixtures (I) and (II) to a first polymeric film; the adhesive mixture (I) or (II) having been prepared closely prior to applying the layer to the first polymeric film; (d) positioning the second polymeric film proximal to the layer and distal to the first polymeric film, such that the layer is between the first and second polymeric films; and (e) allowing the adhesive mixture (I) or (II) to fully react, at a temperature of 50° C. or higher, and then cure under conditions such that crystalline polyester domains are formed prior to completion of cure; such that a laminate is formed.

In another aspect the invention provides the laminate prepared according to the above-described method.

The present invention offers a laminate and method of its preparation that includes incorporation of a polyurethane adhesive layer that imparts to the laminate improved barrier properties to oxygen, in particular. Such improved barrier performance may be ascribed at least in part to the fact that the adhesive layer forms crystalline polyester domains after reaction of the starting polyester polyol and polyisocyanate but prior to completion of cure, and then maintains the crystalline polyester domains following cure. The adhesive layer's formulation also offers particularly convenient application via solvent-based equipment, its solvent-based nature surprisingly also enhancing its barrier properties in comparison with certain other solventless formulations, as further illustrated in the examples and comparative examples hereinbelow.

The first requirement for practice of the inventive method is a liquid polyisocyanate. Preferably such is an aliphatic polyisocyanate, more preferably based on a linear aliphatic diisocyanate. A single species of this diisocyanate is used in the invention, to enable the crystallization step to occur before curing is too advanced to prevent the desired crystallization from occurring. In particular but non-limiting embodiments the polyisocyanate may be selected from a polymeric hexamethylene diisocyanate (i.e., a trimer isocyanurate of HDI), methylene diphenyl diisocyanate (MDI), dicyclohexylmethane 4,4'-diisocyanate ($H_{12}MDI$), and toluene diisocyanate (TDI). Preferred among these is the polymeric hexamethylene diisocyanate (i.e., the trimer isocyanurate of HDI). It is noted that the polyisocyanate generally comprises a small portion of the linear polyurethane chain than does the hydroxyl-terminated polyester, and therefore the choice of polyisocyanate appears to be less critical in determining final barrier properties than does the choice of polyester, which is discussed further hereinbelow. Nonetheless, it is found that HDI offers particularly enhanced barrier properties but at relatively higher cost. Where less stringent barrier properties are acceptable, alternative and less expensive polyisocyanates, such as MDI, make reasonable choices. In keeping with U.S. polyurethane industry custom, the polyisocyanate constitutes the "A-component," or "A-side," of the formulation. (In European industry custom, such constitutes the "B-side" of the formulation.)

Also required for practice of the invention is a hydroxyl-terminated polyester formed from a combination of a diol and a dicarboxylic acid. For this material the diol is a single linear aliphatic diol having from 2 to 10 carbon atoms. This diol is preferably a C3-C6 diol. In certain embodiments, n-butanediol and n-hexanediol are particularly preferred, both from the standpoint of forming an effective adhesive layer in the laminate with desirably high barrier properties and from the standpoint of availability and cost.

The dicarboxylic acid is a linear dicarboxylic acid. Such is preferably selected from adipic acid, azelaic acid, sebacic acid, and combinations thereof. Particularly preferred is adipic acid.

The hydroxyl-terminated polyester may be formed via the reaction of the diol and the dicarboxylic acid. For example, reaction of 1,6-hexanediol and adipic acid forms hexanediol adipate; reaction of 1,4-butanediol and adipic acid forms butanediol adipate; reaction of 1,6-hexanediol and azelaic acid forms hexanediol azelate; and so forth. Conditions for such reactions will be known to, or easily researched by, those skilled in the art. However, such conditions frequently include, in general, admixing the diol and the dicarboxylic acid and heating the admixture at a temperature from 100° C. to 200° C., preferably from 120° C. to 180° C., and most preferably from 140° C. to 160° C., to form the hydroxyl-terminated polyester. The resultant water formed via the condensation reaction may then be removed by distillation. Alternatively the hydroxyl-terminated polyester may be purchased in neat form where available.

It is desirable that the selected hydroxyl-terminated polyester has an OH number from 20, preferably from 100, to 350, preferably to 250. Additional and important properties of the polyester include its being in crystalline (solid) form at ambient temperature and having a melting point that is 80° C. or below; preferably 70° C. or below; more preferably 60° C. or below; and most preferably 55° C. or below. Furthermore, the number average ($M_n$) molecular weight of the polyester is preferably from 300 to 5000, and more preferably from 500 to 2000.

Whether the polyester is prepared or otherwise obtained, for use in the invention it must be combined with a carrier solvent. Alternatively, the polyester may be prepared in situ in the carrier solvent. Such carrier solvent may be selected from a variety of non-protonated solvents and combinations thereof. Non-limiting examples of such include ethyl acetate, methyl ethylketone, dioxolane, acetone and combinations thereof. Preferred among these, in certain embodiments, is ethyl acetate, for reasons of convenience, efficacy and cost. It is desirable that the polyester, which is solid at ambient temperature, as previously noted, be combined with the carrier solvent in a solids content amount ranging from 20 percent, preferably from 30 percent, more preferably from 35 percent, to 80 percent, preferably to 70 percent, preferably to 55 percent, based on the combined weight of the polyester and carrier solvent. In one particularly preferred embodiment, the polyester/solvent mixture preferably has a solids content of from 35 to 40 weight percent. For convenience, and in keeping with US polyurethane industry custom, the combination of the hydroxyl-terminated polyester and the carrier solvent may be termed herein the "B-component," or "B-side," of the formulation. (European industry custom generally denominates this the "A-side.")

Generally, selection of both the polyisocyanate and the hydroxyl-terminated polyester will preferably take into account aspects of temperature. For example, as already noted, the polyisocyanates useful in the invention are liquids at ambient temperatures, i.e., from 20° C. to 25° C., and hydroxyl-terminated polyesters have relatively low melt temperatures, 80° C. or below, due to their low number average molecular weight range, i.e., $M_n$ ranging from 300 to 5000. This means that the resultant adhesive can be applied at an application temperature that is relatively close to ambient (i.e., from ambient to the melt temperature of the hydroxyl-terminated polyester), which helps to ensure that the polymeric materials, e.g., films, being laminated are not degraded, deformed, or even destroyed such as could result if the adhesive had to be applied at a significantly higher temperature. Furthermore, where a polymeric material is particularly heat-sensitive, the hydroxyl-terminated polyester can be selected such that it will melt at a temperature that is even lower (e.g., 70° C. or lower, 60° C. or lower, etc.) to ensure successful application and lamination.

The adhesive formulations useful in the invention may also, in certain embodiments, include certain additional constituents. Those skilled in the polyurethane art will be aware of the wide variety of property- and process-modifying additives available. With respect to methods of preparing laminates, however, a particular possibility may include the need or desire to modify and/or control viscosity in order to ensure application can be acceptably, and preferably optimally, carried out on a given piece of laminating equipment. In order to ensure this, viscosity may be adjusted by, for example, inclusion of a viscosity modifying additive. In one particular embodiment such may be a MODAFLOW™ (MODAFLOW™ is a tradename of Surface Specialties, Inc.) product, e.g., MODAFLOW™ 9200, which is described as an acrylic polymer-based flow/leveling modifier that also enhances wetting by modifying surface tension. Where inclusion of one or more optional additives is desired, it is preferably in an amount from 1 weight percent (wt %), preferably 3 wt %, more preferably 4 wt %, to 8 wt %, preferably 6 wt %, still more preferably 5 wt %, based upon total weight of the formulation including both the A-component and the B-component. Alternative viscosity modifying additives may include, for example, other acrylate, including acrylate-based, materials. Other property-modifying additives may also be selected, such as those affecting other barrier properties, odor, clarity, ultraviolet light stability, flexibility, temperature stability, and so forth. Where any additive is selected, such is typically added to the B-component prior to combination and reaction of such with the A-component.

Those skilled in the art will be very aware of typical methods of combining the polyisocyanate A-component and the hydroxyl-terminated polyester/carrier solvent B-component (which may include additives). In general, these two major components are combined and mixed close to the time of application for lamination purposes, preferably just prior thereto. By "just prior" is meant preferably within about 1 minute or less of application to the polymeric material, or materials, to be laminated. "Closely prior" is used to indicate any time period that does not undesirably interfere with either application of the adhesive to the polymeric film or films and/or attainment of the desired enhanced barrier property or properties in the final laminate. The polyester is desirably in molten or solute form in its carrier solvent and is preferably substantially, more preferably fully, miscible with the solvent, i.e., "substantially" meaning that it is preferably at least 95 wt %, more preferably at least 98 wt %, and most preferably at least 99 wt %, miscible, and the polyisocyanate is in liquid form, thereby enabling convenient mixing and maximizing of the degree and uniformity of reaction. Once combined, the reacting mixture is termed the adhesive mixture.

In another embodiment of the present invention it is also possible to pre-react all (or a larger portion) of the A-component with a (smaller) portion of the B-component, so as to form a low viscosity isocyanate-capped prepolymer, followed by reacting the remainder of the B-component with the prepolymer. The final NCO/OH ratio still ranges from 1 to 2, preferably from 1.2 to 1.4, at the point of application of the adhesive mixture composition to the polymeric material, but in making the prepolymer the NCO/OH ratio is preferably from 2 to 8. The prepolymer route may be one method of preventing the viscosity from being too low at the application temperature, which may then enable tighter viscosity control via other methods such as the use of viscosity modifiers/leveling agents. In preferred embodiments all of the A-component is reacted with an appropriate portion of the B-component. However, in alternative embodiments, use of even 25 wt % of the A-component in a prepolymer will significantly increase viscosity. Preferably at least 50 wt % of the B-component is pre-reacted when a prepolymer route is pursued for viscosity adjustment purposes.

Ultimately an NCO/OH ratio of 1 is theoretically desired for the polyurethane adhesive, regardless of whether or not a prepolymer route is employed. However, because the polyester will, in many instances, contain some residual water from the polyester condensation reaction, an excess of polyisocyanate is typically used, up to an NCO/OH ratio of about 2, preferably from 1.2 to 1.4.

Those skilled in the art will be well aware of the type of equipment typically used or useful for lamination and constraints that may result from selection thereof. For example, so-called high speed laminating machines may require a viscosity of the adhesive formulation (comprising the A-component, including any additives, and the B-component) ranging from 300 to 2000 centipoise (cPs, 300 to 2000 millipascal·second, mPa·s), preferably from 400 to 1000 cPs (400 to 1000 mPa·s) at the laminating temperature. This helps to enable coating weights that typically range from 1 to 3 pounds per ream (lb/rm, 1.6 to 4.9 grams per square meter, g/m$^2$), preferably 1.5 lb/rm (2.4 g/m$^2$). In general, the lamination equipment may be operated preferably at a rate of from 30 m/min, more preferably from 50 m/min, and still more preferably from 100 m/min, to 500 m/min, more preferably to 400 m/min, and still more preferably from 300 m/min. In certain particular embodiments the laminating equipment is most preferably operated at a rate from 150 m/min to 250 m/min. The laminating temperature ("lamination" or "laminating" including both application of the adhesive as a layer on at least one polymeric film and positioning of the two polymeric films such that the adhesive layer is between them) may be adjusted according to the polymeric materials being laminated, but as previously noted, it is preferably 80° C. or below, more preferably 70° C. or below, even more preferably 60° C. or below, and most preferably 55° C. or below. Accordingly, for reference purposes, the above-described viscosity ranges should correspond to at least one of the above-listed temperatures, e.g., from approximately ambient to 80° C.

Following application of the adhesive mixture on the carrier web, i.e., positioning of the adhesive layer proximal to the carrier web, the carrier web is preferably subjected to a drying protocol to remove the carrier solvent from the adhesive mixture. Most conveniently, in one embodiment, the carrier web may be transported through a drying tunnel for a time that is preferably sufficient to remove most, more preferably substantially all, i.e., at least 95 weight percent (wt %), more preferably at least 98 wt %, of the carrier solvent therefrom. In certain particular but non-limiting embodiments the drying temperature may vary from 60° C. to 90° C. and time may vary from 0.1 second to 10 seconds, preferably 1 second to 6 seconds. As previously noted, it is desirable not to use too high a temperature such that the formation of crystalline domains is not undesirably diminished or disrupted. In this embodiment, the solvent is removed prior to the carrier web being coupled with the secondary web at the nip. Positioning of the secondary web following drying is such that it is proximal to the adhesive layer but distal to the carrier web, i.e., the adhesive layer is between the two webs.

Following lamination the now-adhered, three-layer structure is nipped at a temperature that is preferably higher than the lamination temperature. In this embodiment, the nip roll temperature is preferably 40° C. or higher, more preferably 60° C. or higher, still more preferably 80° C. or higher. Such is preferably accomplished at a temperature that is sufficiently high to ensure excellent bond strength of the polymeric film layers without degradation of either the polymeric films or of the adhesive. Following nip, the three-layer structure is then chilled by rolling on a chill roll, which allows the adhesive formulation to complete reaction and begin, and then compete, its cure stage. For this purpose, the chill roll temperature is preferably 40° C. or below, more preferably 20° C. or below, and still more preferably 5° C. or below. Time on the chill roll will generally depend upon the configuration of the laminating equipment of which it is part and the overall lamination speed, which is discussed hereinabove. Additional chill equipment may also be used to enhance the crystallization of the adhesive before it becomes fully cured, if desired. Following the chill cycle, the laminate is rolled onto the reel and the reel is stored, usually at ambient temperature, for a period of time to enable full completion of the reaction and cure.

The result of this process is that a relatively slow urethane-forming reaction is begun at the point of first mixing the A-component and B-component and continues, wherein crystalline polyester domains are formed prior to completion of the reaction and substantial cure of the adhesive mixture and maintained permanently in the adhesive layer of the final cured laminate. It is important that crystalline polyester domains are, indeed, formed, which means that curing rate is desirably controlled to ensure this. For example, if curing temperature is too high or a particularly reactive polyisocyanate is selected, crystalline domains may not form and the advantages of the invention are not attained. For example, some MDI-based prepolymers and TDI-based prepolymers are highly reactive and may result in insufficient crystallization, if any, such that the oxygen transmission rate of the final laminate is unacceptably high. In general, then, desirably conditions include a reaction/curing temperature that preferably does not exceed 35° C., more preferably 30° C., and a time that is preferably at least 3 days, more preferably at least 5 days, and most preferably at least 7 days. The presence of crystalline domains may be confirmed via differential scanning calorimetry (DSC) of the adhesive alone. This DSC is preferably done after subjection of the adhesive system to a heating and cooling cycle that correspond to what would be occurring on the relevant lamination equipment. Such a DSC enables observation of the melting endotherm and the crystallization exotherm. An alternative analytical method to confirm the formation of crystalline domains is polarized light microscopy.

Regardless of analytical method employed, the goal is generally to maximize the formation of crystalline domains in order to consequently minimize the oxygen transmission rate of the laminate. Thus, quantification of crystalline domain formation may be accomplished inductively, based on the understanding that increased crystalline domain formation reduces oxygen transmission rate. A form of inherent quantification can also be based on the analytical methods discussed hereinabove. For example, a DSC which lacks a crystallization exotherm will define a given adhesive system as falling outside of the scope of the invention, and a DSC exhibiting a strong crystallization exotherm will be expected to show a lower oxygen transmission rate than one in which the crystallization exotherm is weaker. It is preferred that, based on polarized light microscopy is, crystalline domains be present in at least 10 percent (%) of a given field, more preferably at least 25%, and most preferably at least 50%.

The adhesives of the present invention are useful for adhering a wide variety of polymer materials, including films, and moreover including polypropylenes, such as, for example, oriented polypropylene (oPP); polyethylenes, such as low density polyethylene (LDPE) and polyethylene terephthalate (PETP); polyesters; polyamides; cellophanes; coextruded materials (COEX); metalized versions of these polymers, such as metalized oriented polypropylene (met oPP); coated versions of these polymers, such as those coated with aluminum oxide ("AlOx," indicating any of the various compounds including aluminum and oxygen, including but not limited to $Al_2O_3$) and/or silicon oxide ("SiOx," indicating any of the various compounds including silicon and oxygen, including but not limited to $SiO_2$), and combinations thereof. In particular, the adhesives are particularly useful to prepare laminates of materials having unacceptable or undesirable barrier properties, such that the barrier properties are enhanced to a level that is acceptable or desirable. A particular advantage of the invention is that the bond strengths between the laminate layers, between which the adhesive is interposed, frequently achieve desirable levels, making delamination or separation unlikely and/or very difficult, regardless of environmental temperatures.

Another advantage attainable through practice of the invention is that the oxygen transmission rate shows surprising levels of retention, even after flex-cracking tests. This means that the invention may show particular applicability for flexible packaging where oxygen bather properties are sought. In particular embodiments, in testing under an ASTM F392/F392M flex-crack protocol, the laminate may show a rate of oxygen transmission after flex-crack that is preferably at least 60 percent of the rate before flex-crack, more preferably at least 80 percent of the rate before flex-crack.

EXAMPLES 1-2 AND COMPARATIVE EXAMPLES A-F

Solvent-based adhesive formulations representing Examples ("Ex.") 1-2 are prepared including the components shown in Table 1. Comparative Examples ("CEx.") A-F are also prepared as shown in Table 1. Identifications of components are as follows:

BESTER™ 86 is a crystalline polyester that is a solid at 25° C. and has a melting point <80° C. It is available from Rohm and Haas Italia.

MOR-FREE™ C79 is a hydroxyl-containing component and is a blend of materials including castor oil (an ester but not a polyester), and no crystalline polyester. It is part of a solventless, two-component polyurethane adhesive system available from The Dow Chemical Company.

ADCOTE™ 301A+350A is a solvent-based, two-component polyurethane adhesive system available from The Dow Chemical Company. The hydroxyl-containing component is based on polyethers.

MOR-FREE™ 200C is an HDI based isocyanurate that can be used as part of a solventless or solvent-based, two-component polyurethane adhesive system available from The Dow Chemical Company.

MOR-FREE™ 698A is an MDI based prepolymer containing a non-crystalline polyester. It is part of a solventless, two-component polyurethane adhesive system available from The Dow Chemical Company.

MODAFLOW RESIN™ is a flow modifier containing an acrylic polymer (>99.0%), available from Cytec Industries.

The formulations are prepared by mixing the viscosity modifier into the hydroxyl-containing component, and then mixing the hydroxyl-containing component and the polyisocyanate component in a method known to those skilled in the art as a "one-shot" polyurethane method. This is carried out at a temperature of 25° C. under ambient pressure, using ULTRA-TURAX™ equipment for mixing.

TABLE 1

| Ex. or CEx. | OH Component (w/w) | NCO Component (w/w) | Viscosity Modifier (w/w) | Solids (% by weight) in Solvent | Mix Ratio (%, OH component to NCO component) |
|---|---|---|---|---|---|
| Ex. 1 | BESTER 86, 95.2% | MOR-FREE 200C | MODAFLOW, 4.8% | 40% in ethyl acetate | 100:60 |
| Ex. 2 | BESTER 86, 95.2% | MOR-FREE 200C | MODAFLOW, 4.8% | 40% in ethyl acetate | 100:60 |
| CEx. A | BESTER 86, 95.2% | MOR-FREE 200C | MODAFLOW, 4.8% | n/a | 100:60 |
| CEx. B | BESTER 86, 95.2% | MOR-FREE 200C | MODAFLOW, 4.8% | n/a | 100:60 |
| CEx. C | BESTER 86, 95.2% | MOR-FREE 200C | MODAFLOW, 4.8% | n/a | 100:60 |

TABLE 1-continued

| Ex. or CEx. | OH Component (w/w) | NCO Component (w/w) | Viscosity Modifier (w/w) | Solids (% by weight) in Solvent | Mix Ratio (%, OH component to NCO component) |
|---|---|---|---|---|---|
| CEx. D | C79, 33.3% | MOR-FREE 698A | n/a | n/a | 100:50 |
| CEx. E | C79, 33.3% | MOR-FREE 698A | n/a | n/a | 100:50 |
| CEx. F | ADCOTE 301A, 60% | ADCOTE 350A, 40% | n/a | 40% in ethyl acetate | 60:40 | n/a means not applicable, i.e., not included in that formulation

The combined materials, now termed the adhesive mixture composition, are then quickly fed into the tray of a NORDMECANNICA™ LABO COMBI™ 400 laminator for use in laminating together two polymer films. Using a typical doctor blade, the adhesive mixture is applied to the upward-facing surface of a first polymer film, denominated the "carrier web;" a second polymer film, denominated the "secondary web," is then placed on top of the adhesive layer; and the two films are nipped together. The thickness of the adhesive layer is determined, pre-nip and as an average, by taking a presized sample of the laminate and weighing it first with the adhesive on it, and then weighing it again after wiping all of the adhesive off with a solvent-wet cloth. The resulting laminate is rolled onto a reel. Coating weight is in excess of 2 g$^2$/m; nip roll temperature is greater than or equal to 50° C., most preferably greater or equal to 80° C.; film temperature of the secondary web is greater than or equal to 25° C., preferably greater or equal to 40° C.; and curing temperature is greater than 15° C. but less than 30° C.

Testing is then carried out for bond strength following 7 days cure time, as well as oxygen transmission rate. Testing protocol for OTR corresponds to ASTM D 3985. Results of the testing are then recorded in Table 2.

TABLE 2

| | Carrier Web | Secondary Web | Nip T. [° C.] | Adhesive thickness [μm] | Bond Strength, 7 days [N/15 mm] | ***OTR [cm$^3$O$_2$/m$^2$/day] |
|---|---|---|---|---|---|---|
| Ex. 1 | PETP | LDPE | 90 | 3.54 | Tear | 28.3 |
| Ex. 2 | PETP | LDPE | 60 | 3.11 | Tear | 56.3 |
| C. Ex. A | Met oPP | oPP | 90 | 2.7 | m. transf.* | 2.32 |
| CEx. B | PETP | LDPE | 90 | 2.63 | 2.8 | 34.0 |
| CEx. C | oPP | LDPE | 90 | 2.59 | d. coex** | 73.1 |
| CEx. D | PETP | LDPE | 45 | 2.60 | 5.5 | 93.4 |
| CEx. E | oPP | LDPE | 45 | 2.45 | d. coex | 9886.5 |
| CEx. F | PETP | LDPE | 50 | 3.59 | Tear | 114.40 |

*m. transf. = metal transfer
**d.coex = delamination of the coextruded film
***OTR = oxygen transmission rate The results show that the Examples 1 and 2 show significant improvements in OTR when compared to the same web combination under the same or similar nip temperature (CEx. B and CEx. F). The solvent-based inventive adhesive, as shown in Examples 1 and 2, does not require preheating of either the carrier film or of the adhesive prior to application and the resulting laminate shows generally better bond strengths.

Examples 3-6

Flex-crack testing of a variety of samples is carried out under a protocol similar to ASTM F392/F392M. Results are shown in Table 3.

TABLE 3

| Example No. | Carrier Web | Secondary Web | OTR before flex-cracking [cm$^3$O$_2$/m$^2$/day] | OTR after flex-cracking [cm$^3$O$_2$/m$^2$/day] |
|---|---|---|---|---|
| Ex. 3 | Met oPP | oPP | 20 | Up to 70 |
| Ex. 4 | Met oPP | PETP | 1.25 | 1.2 |
| Ex. 5 | Met oPP | oPP | 1.8 | 3 |
| Ex. 6 | Met oPP | Paper | 3.5 | 12.95 |

The invention claimed is:

1. A method of making a laminate, comprising
   (a) preparing an adhesive mixture by
       (i) providing a single species of polyisocyanate (A) as an A-component;
       (ii) also providing a hydroxyl-terminated polyester (B), formed from a single species of a linear aliphatic diol having terminal hydroxyl groups and from 2 to 10 carbon atoms, and a single species of a linear dicarboxylic acid, the polyester having a number average molecular weight from 300 to 5000, and being solid at 25° C., and having a melting point of 80° C. or below, the hydroxyl-terminated polyester (B) being incorporated as substantially miscible solids in a carrier solvent in an amount of at least 20 percent by weight, based on the weight of (B) and the carrier solvent, to form a B-component, wherein the carrier solvent comprises a non-protonated solvent;

(b) either (i) mixing the A-component and the B-component at an NCO/OH ratio from 1 to 2 to form an adhesive mixture (I), or (ii) reacting all or a portion of the A-component and a portion of the B-component at an NCO/OH ratio of from 2 to 8 to form a prepolymer (C) and then mixing the remaining portion of the B-component and any remaining portion of the A-component with the prepolymer (C) to form an adhesive mixture (II) having an NCO/OH ratio from 1 to 2;

(c) applying a layer of at least one of the adhesive mixtures (I) and (II) to a first polymeric film; the adhesive mixture (I) or (II) having been prepared closely prior to applying the layer to the first polymeric film;

(d) positioning the second polymeric film proximal to the layer and distal to the first polymeric film, such that the layer is between the first and second polymeric films; and (e) allowing the adhesive mixture (I) or (II) to fully react, at a temperature of 50° C. or higher, and then to cure under conditions such that crystalline polyester domains are formed prior to completion of cure;

such that a laminate is formed.

2. The method of claim 1 wherein the solids are present in an amount of from 20 percent to 80 percent, based on the weight of the A-component and the B-component combined.

3. The method of claim 1 wherein the hydroxyl-terminated polyester is formed from a C3-C6 diol and a dicarboxylic acid selected from the group consisting of adipic acid, azelaic acid, sebacic acid, and combinations thereof.

4. The method of claim 1 wherein the polyisocyanate is selected from the group consisting of polymeric hexamethylene diiocyanate (HDI trimer isocyanurate), methylene diphenyl diisocyanate, dicyclohexylmethane 4,4'-diisocyanate, and toluene diisocyanate.

5. The method of claim 1 wherein the carrier solvent is selected from the group consisting of ethyl acetate, methyl ethylketone, dioxolane, acetone, and combinations thereof.

6. The method of claim 1 wherein an acrylate viscosity modifier is included in the B-component prior to mixing the A-component and the B-component together.

7. The method of claim 1 wherein the conditions of the reaction and cure include a temperature of less than 30° C. and a time of at least 7 days.

8. The method of claim 1 wherein the first polymeric film and the second polymeric film are independently selected from the group consisting of metalized, non-metalized, aluminum oxide-coated and silicon oxide-coated films of low density polyethylene, oriented polypropylene, polyester, polyamide, polyethylene terephthalate, cellophane, and combinations thereof.

9. The method of claim 1 wherein, under ASTM F392/F392M flex-crack testing, the laminate shows a rate of oxygen transmission after flex-crack that is at least 60 percent of the rate before flex-crack.

* * * * *